US012071807B2

(12) United States Patent
Greene

(10) Patent No.: US 12,071,807 B2
(45) Date of Patent: Aug. 27, 2024

(54) BIODEGRADABLE INSULATING FILM KIT

(71) Applicant: Jacobs & Thompson Inc., Toronto (CA)

(72) Inventor: Robert Greene, Barrie (CA)

(73) Assignee: JACOBS & THOMPSON LTD., Toronto (CA)

( * ) Notice: Subject to any disclaimer, the term of this patent is extended or adjusted under 35 U.S.C. 154(b) by 0 days.

(21) Appl. No.: 17/561,695

(22) Filed: Dec. 23, 2021

(65) Prior Publication Data

US 2022/0195785 A1 Jun. 23, 2022

Related U.S. Application Data

(60) Provisional application No. 63/129,656, filed on Dec. 23, 2020.

(51) Int. Cl.
*E06B 3/28* (2006.01)
*E04B 1/78* (2006.01)

(52) U.S. Cl.
CPC ................ *E06B 3/285* (2013.01); *E04B 1/78* (2013.01); *E04B 2103/04* (2013.01)

(58) Field of Classification Search
CPC .......... E06B 3/285; E06B 3/5454; E06B 7/12; E04B 1/78; E04B 2103/04
See application file for complete search history.

(56) References Cited

U.S. PATENT DOCUMENTS 2,514,316 A * 7/1950 Dobrin .................... E06B 3/285 160/102
3,075,248 A * 1/1963 Harrison ................. E06B 3/285 160/90
4,064,314 A * 12/1977 McKenzie ............ B32B 27/308 160/19

(Continued)

FOREIGN PATENT DOCUMENTS

JP 3213556 U 11/2017

OTHER PUBLICATIONS

Oxo-Biodegrade Polyolefin Shrink Film pamphlet printed for Shandong Dmpack Tech Co., Ltd. on Feb. 12, 2020. Shandong Dmpack Tech Co., LTD.'s full postal address is The Creative Building, No. 69 Haichuan Road, High-New Zone, Jining 272000, China, and the website is dmpackfilm.com.

(Continued)

*Primary Examiner* — Rodney Mintz
(74) *Attorney, Agent, or Firm* — Aird & McBurney LP

(57) ABSTRACT

In an aspect, an insulation kit for insulating an interior side of a window is provided. The window includes a window pane and a window frame having a window aperture in which the window pane is mounted, and at least one surface on the interior side of the window which extends around an exterior edge of the window aperture. The insulation kit includes a adhesive member and a sheet of insulating, biodegradable film sized to be mounted to a surface of the window frame by the adhesive member so as to cover the (Continued)

window aperture, and being heat shrinkable to form an airtight seal, insulating the window pane on the interior side of the window. The sheet of film is constructed to be mounted to the at least one surface of the window frame for a period of at least four months before degradation of the film occurs.

2 Claims, 5 Drawing Sheets

(56) References Cited

U.S. PATENT DOCUMENTS 4,242,414 A * 12/1980 McKenzie .............. B32B 27/30 160/19
4,433,712 A * 2/1984 Mellon .................. A47H 99/00 160/122
4,544,587 A * 10/1985 Nesbitt ................... E06B 3/285 428/920
4,562,675 A * 1/1986 Baigas, Jr. .............. E06B 3/285 160/354
4,699,842 A * 10/1987 Jorgensen ............. C08F 291/00 428/355 R
4,835,217 A * 5/1989 Jorgensen ................ C09J 7/381 525/212
4,911,964 A * 3/1990 Corbo ..................... E06B 3/285 428/354
5,108,811 A * 4/1992 Shippen ................ B32B 27/065 428/355 R
5,368,085 A * 11/1994 Ruparelia ............. E06B 3/6205 160/354
5,466,500 A * 11/1995 Pluim ..................... E06B 3/285 428/354
5,937,595 A * 8/1999 Miller ..................... E06B 3/285 52/2.25
5,937,596 A * 8/1999 Leeuwenburgh ....... E06B 3/285 160/354
6,141,921 A * 11/2000 Leeuwenburgh ....... E06B 3/285 428/40.1
6,197,419 B1 * 3/2001 Hyde ......................... C09J 7/38 428/354
8,372,508 B2 * 2/2013 Reuter .................... E06B 3/285 52/746.1
8,605,356 B2 * 12/2013 Ylitalo .................... E06B 3/285 359/359
11,156,027 B1 * 10/2021 Ford ..................... E06B 3/5814
11,168,512 B2 * 11/2021 Gerstein ................... E04B 1/78
11,708,717 B2 * 7/2023 Minaudo ............. E06B 3/26303 52/204.7
2004/0175518 A1 * 9/2004 Wilburn .................. B32B 27/08 428/34.9
2007/0243350 A1 * 10/2007 Forsberg ................. C08L 23/10 428/35.7
2008/0155910 A1 * 7/2008 Reuter .................... E06B 3/285 52/746.1
2008/0155911 A1 * 7/2008 Reuter .............. B32B 17/10018 52/746.1
2008/0156423 A1 * 7/2008 Reuter .................... B44C 1/105 156/230
2008/0160241 A1 * 7/2008 Reuter ...................... E06B 3/30 428/192
2009/0173451 A1 * 7/2009 Walker .................... E06B 3/285 156/929
2010/0035048 A1 * 2/2010 Reuter .............. B32B 17/10018 156/247
2011/0109957 A1 * 5/2011 Ylitalo .................... F24S 20/63 359/359
2015/0037865 A1 * 2/2015 Weder .................... D21H 23/22 428/17
2015/0336361 A1 * 11/2015 Masaki ................... B32B 27/30 428/220
2015/0354209 A1 * 12/2015 Shippen .................... B32B 7/12 428/319.3
2016/0263867 A1 * 9/2016 Shippen ............ B32B 17/10256
2018/0245396 A1 * 8/2018 Gilliam ................... E06B 3/285
2019/0022987 A1 * 1/2019 Shippen .................. B32B 17/06
2020/0011114 A1 * 1/2020 Gerstein ............ B65D 83/0841
2021/0341659 A1 * 11/2021 Matsui ................... G02B 5/305
2021/0372193 A1 * 12/2021 Minaudo ............. E06B 3/26303

OTHER PUBLICATIONS

Mohan, Chander, "Eco-Friendly Plastics from Potatoes", webpage <krishijagran.com>, 1 page, Oct. 22, 2018, retrieved from <https://krishijagran.com/news/eco-friendly-plastic-from-potatoes/> on Sep. 14, 2023.

* cited by examiner

BIODEGRADABLE INSULATING FILM KIT

CROSS-REFERENCE TO RELATED APPLICATIONS

The present application claims the benefit of U.S. Provisional Application No. 63/129,656 filed Dec. 23, 2020, the contents of which is are incorporated herein in their entireties.

FIELD

The present disclosure relates to a biodegradable film kit for providing insulation and preventing condensation on a glass window or door. More particularly, the present disclosure relates to heat-shrinkable, biodegradable film kit whose film will biodegrade after a predetermined interval of time.

BACKGROUND OF THE DISCLOSURE

In commercial and residential buildings, condensation can form on the inside surfaces of windows due to the ambient interior temperature being warmer than an ambient temperature outside the building. Furthermore, heat loss can occur in the winter and heat gain can occur in the summer, via windows and doors in buildings. It is well known to provide an insulating window film that is attached to a frame around a window. These films are easy to install and can inhibit the generation of condensate on a window's interior surface. These window films are generally formed of stretchable, insulating polymers that can be heat shrunk to reduce in size and protect the window. Polyolefins and polyvinyl chlorides are the two major families of plastic resins from which the bulk of commercially available shrink films for window covering purposes are made of. Other resin families from which shrink films can be made include the ionomers, polyesters and polystyrenes. These films are effective at insulating and reducing condensation on windows, however, once they are used, they are typically not recyclable and are thus disposed of in a way that contributes to the worsening pollution problem that is present in many countries. With the increased focus in the world day on utilizing fewer natural resources and reducing household waste, there is clearly a need for a window film which has a smaller environmental footprint when it is disposed of at the end of its service life. It would be advantageous to provide such a film, while retaining the qualities of the film that make it effective for use in insulating windows and doors.

SUMMARY OF THE DISCLOSURE

In one aspect, there is provided an insulation kit for insulating an interior side of a window of a building, the window including a window pane and a window frame having a window aperture in which the window pane is mounted, and at least one surface on the interior side of the window which extends around an exterior edge of the window aperture. The insulation kit includes a adhesive member and a sheet of insulating, biodegradable, polyolefin film sized to be mounted to the at least one surface of the window frame by the adhesive member so as to cover the window aperture, and being heat shrinkable such that when a stream of heated air is supplied to the sheet of biodegradable, polyolefin film, the biodegradable, polyolefin film contracts to form an airtight seal, insulating the window pane on the interior side of the window. The sheet of insulating biodegradable, polyolefin film is constructed to be mounted to the at least one surface of the window frame for a period of at least four months before degradation of the biodegradable, polyolefin film occurs to an extent where the biodegradable, polyolefin film no longer forms an airtight seal which insulates the window pane on the interior side of the window.

In another aspect, there is provided an insulation kit for insulating an interior side of a window of a building, the window including a window pane and a window frame having a window aperture in which the window pane is mounted and at least one surface on the interior side of the window which extends around an exterior edge of the window aperture. The insulation kit includes a adhesive member, and a sheet of insulating, biodegradable, polyolefin film sized to be mounted to the at least one surface of the window frame by the adhesive member so as to cover the window aperture, and being heat shrinkable such that when a stream of heated air is supplied to the sheet of biodegradable, polyolefin, the biodegradable, polyolefin film will contract to form an airtight seal, insulating the window pane on the interior side of the window. The biodegradable, polyolefin is fabricated so as to linearly contract by at least 65% when unrestrained and when the temperature of the heated air supplied to the biodegradable, polyolefin film is at or above 120 degrees Celsius.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings, as follows.

Figure 1A:
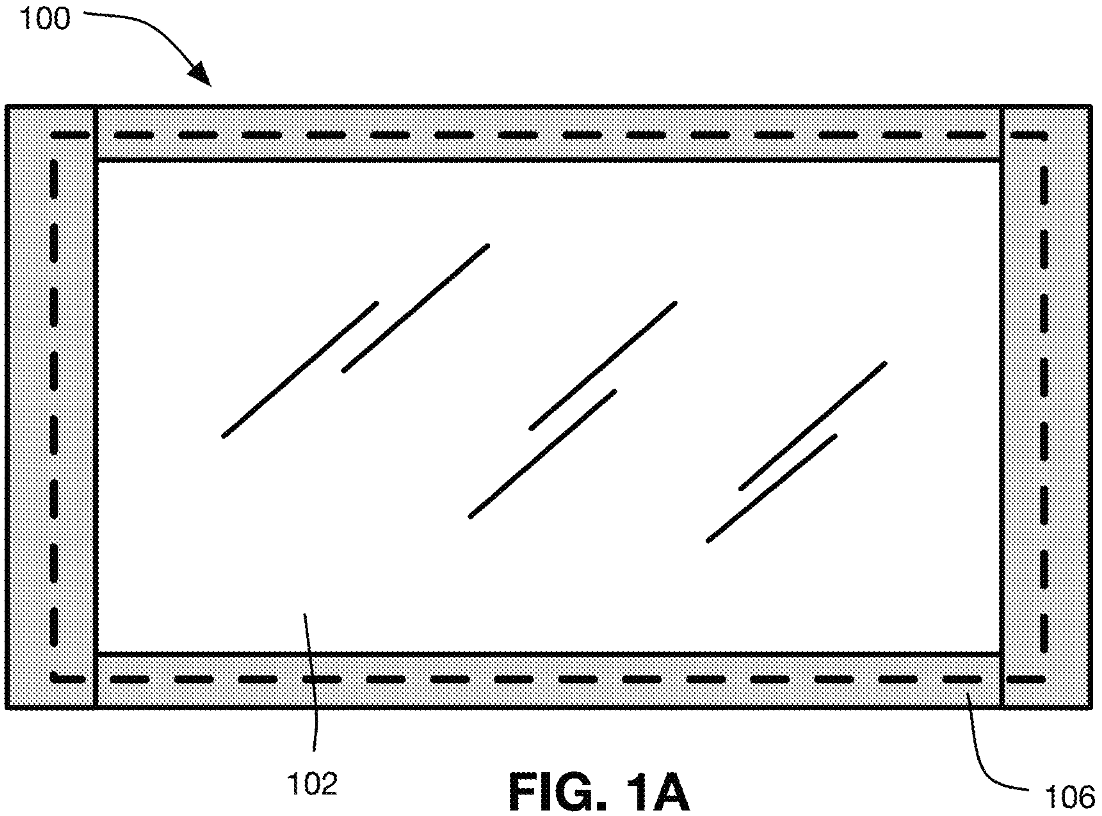
FIG. 1A is an elevation view of a window.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: “or” as used throughout is inclusive, as though written “and/or”; singular articles and pronouns as used throughout include their plural forms, and vice versa; similarly, gendered pronouns include their counterpart pronouns so that pronouns should not be understood as limiting anything described herein to use, implementation, performance, etc. by a single gender; “exemplary” should be understood as “illustrative” or “exemplifying” and not necessarily as “preferred” over other embodiments. Further definitions for terms may be set out herein; these may apply to prior and subsequent instances of those terms, as will be understood from a reading of the present description. It will also be noted that the use of the term “a” or “an” will be understood to denote “at least one” in all instances unless explicitly stated otherwise or unless it would be understood to be obvious that it must mean “one”.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, “each” refers to each member of a set or each member of a subset of a set.

As used herein, the terms “about” and “approximately” are meant to cover variations that may exist in the upper and lower limits of the ranges of values, such as variations in properties, parameters, and dimensions. Unless otherwise specified, the terms “about” and “approximately” mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term “on the order of”, when used in conjunction with a quantity or parameter, refers to a range spanning approximately one tenth to ten times the stated quantity or parameter.

Unless specifically set forth and defined or limited, the term “polymer” as used herein generally includes homopolymers, copolymers, terpolymers, block, graft polymers, random, and alternating polymers.

The term “linearly contract” as used herein is the amount, as a percent of the original length of an unrestrained section of the polymer sheet, that the length of the section of polymer sheet will be reduced by when a supply of hot air at a specific temperature is applied, as described in ASTM D2732.

Figure 1B:
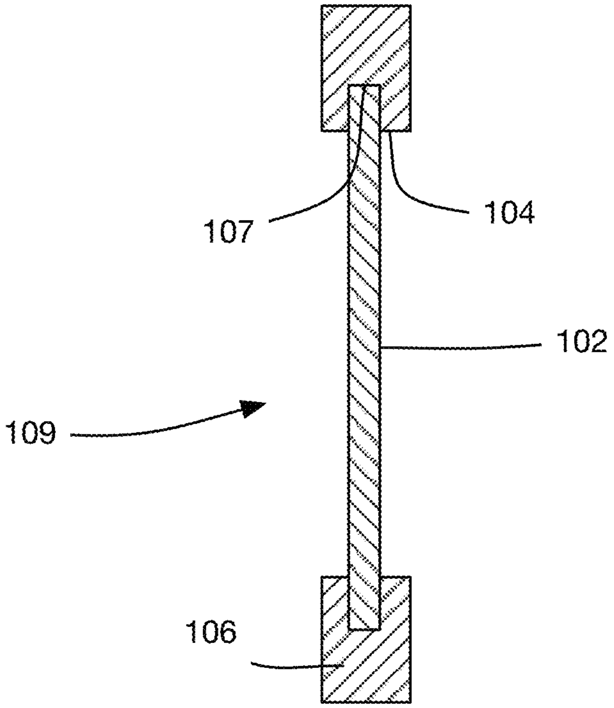
FIG. 1B is a sectional elevation view of the window.

Referring to FIGS. 1A and 1B, a window 100 includes an at least partially transparent window pane 102 and a window frame 106 having a window aperture 104 in which the window pane 102 is mounted. In the window aperture 104 of the window frame 106 is a groove 107 that is sized to receive and securely hold the glass window pane 102. This window frame 106 may be a frame for a window that is mounted in the wall of a building or it may be the frame for a window that is mounted within a door. The window frame 106 may be composed of a variety of suitably rigid materials. Materials suitable for the frame include metal, wood, plastic, and melamine. The window aperture 104 of the window frame and the window frame 106 itself may have a variety of shapes and sizes. The various embodiments of the window frame 106 all comprise a peripheral surface 108 on an interior side 109 of the window frame 106 which extends around a peripheral edge of the window aperture 104 of the window frame 106 and surrounds the window aperture 104.

A window film kit 150 (FIGS. 2, 3A and 3B) in accordance with an embodiment of the present disclosure includes an insulating, biodegradable sheet 110 for insulating an interior side of the window 100, and an adhesive member 101. The sheet 110 is generally stretched across the interior side (shown at 111) of the window frame 106 of the window 100 to form an air pocket that blocks drafts and disrupts convection of the interior air mass across the too-cold (or too-warm) window pane 102. The sheet 110 also acts to limit condensation formation on the window pane 102 by collecting condensate that forms during the transfer of heat through the window pane 102. By ‘too-cold’ it is meant that the window pane 102 is colder than the ambient air at the interior side 109 of the window 100. By ‘too-warm’ it is meant that the window pane 102 is warmer than the ambient air at the interior side 109 of the window 100.

Figure 3B:
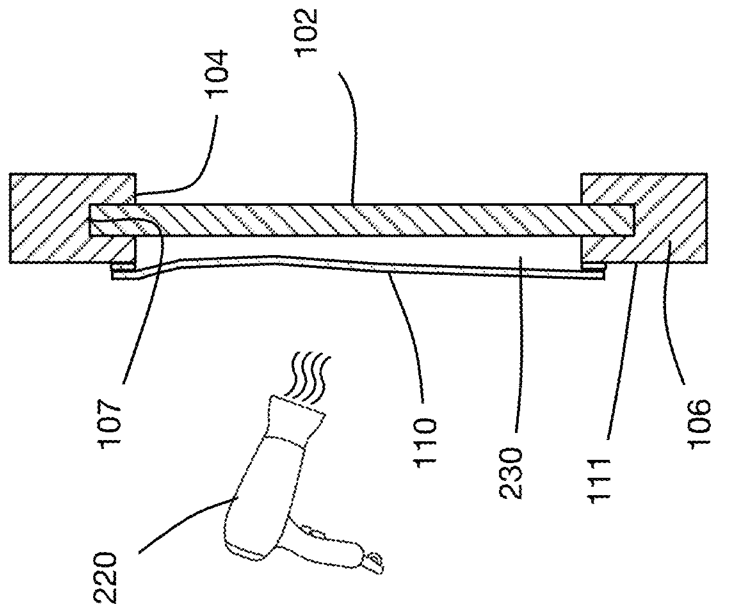
FIG. 3B is a sectional elevation view of the window shown in FIG. 1B with a sheet from the kit shown in FIG. 2 partially installed thereon.
Figure 3A:
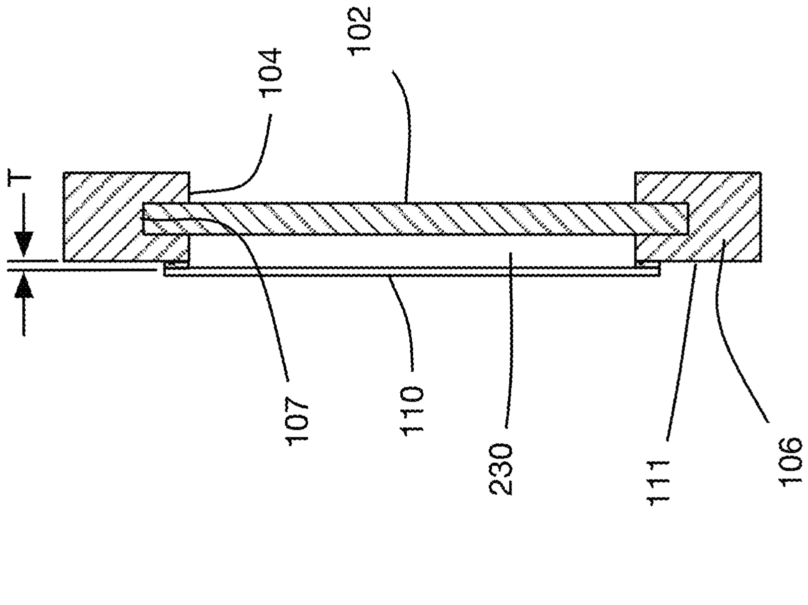
FIG. 3A is a sectional elevation view of the window shown in FIG. 1B with a sheet from the kit shown in FIG. 2 installed thereon.

The sheet 110 may be a biodegradable sheet of polyolefin film. Referring to FIGS. 3A and 3B, the sheet 110 is mounted on the window frame 106. FIG. 3A shows the sheet 110 once the installation thereof is complete. FIG. 3B shows the sheet in an intermediate stage of installation. As a first step, the sheet 110 is adhered about its entire periphery to the peripheral surface 108, using the adhesive member 111. The adhesive member 111 may be a strip of two-sided adhesive tape, for example.

The sheet 110 is preferably heat shrinkable, such that the application of a stream of heated air (e.g. from a heat source 220 shown in FIG. 3B), such as a blow dryer) to the sheet 110 causes the sheet 110 to contract. The sheet 110 is sized to be mounted to the at least one surface 108 of the window frame 106 by a adhesive member so as to completely cover the window aperture 104 of the window frame 106, regardless of the shape of the window aperture 104 and window pane 102.

Figure 2:
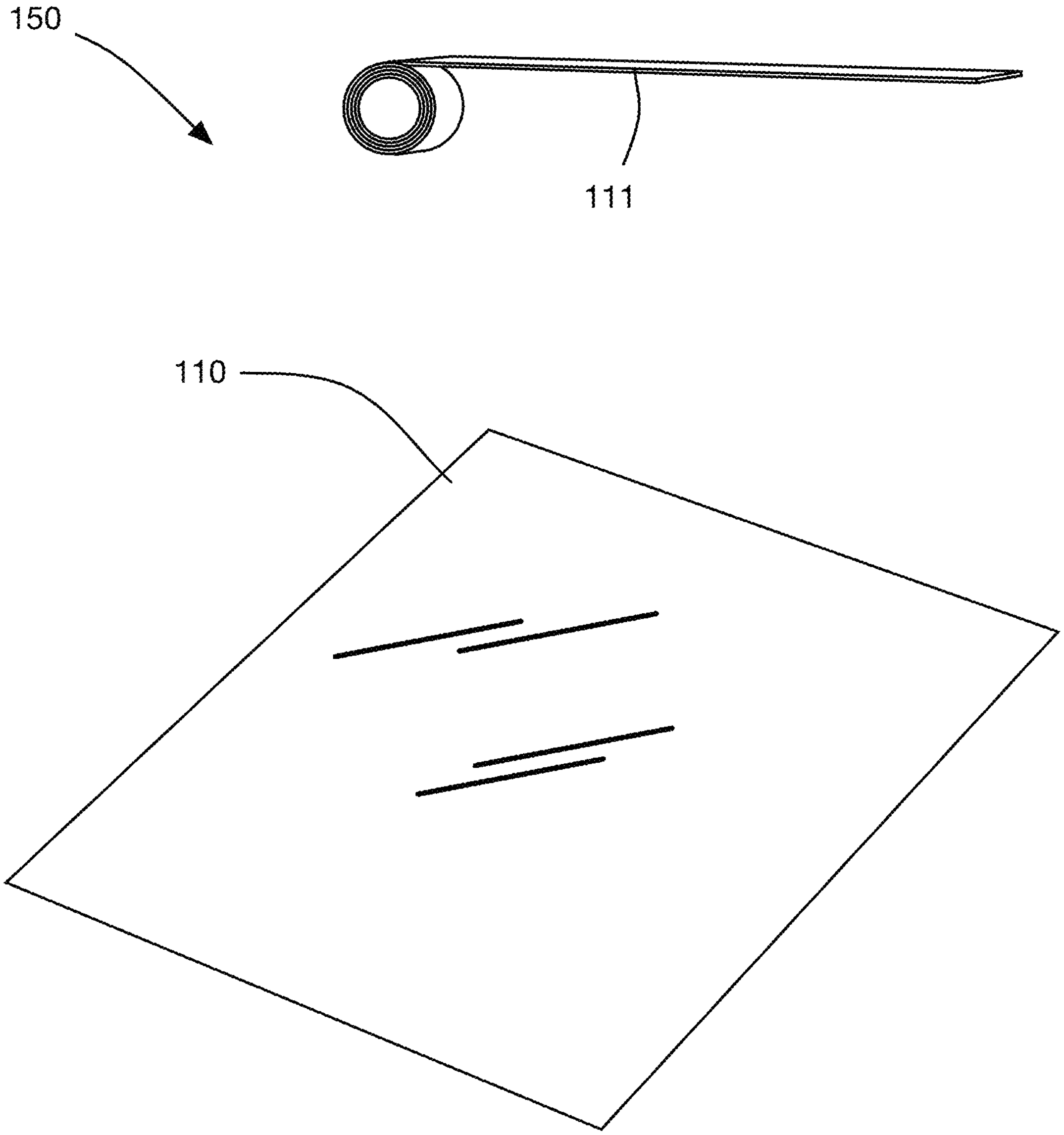
FIG. 2 is a perspective view of an insulation kit in accordance with an embodiment of the present disclosure.

Referring to FIG. 2, the change in shape of an exemplary sheet 110 that is suspended across the window frame 106 is shown. The sheet 110 goes from a loose fitting configuration 200 to a taut configuration 210 where it forms a seal across the window aperture 104 of the window frame. This change in shape occurs due to the application of a supply of hot air to the sheet 110 by a heat supplying device 220. When a supply of heated air is applied across the sheet 110 by the heat supplying device 220, the sheet 110 contracts and is pulled taut in all directions across the window aperture 104. The sheet 110 has sufficient ability to stretch under tension so as to be taut when contracted due to heat input, while maintaining a tight seal around the window aperture 104. As the sheet 110 is adhered to all sides of the window frame 106 surrounding the window aperture 104 by the adhesive member 111, the contraction of the sheet 110 stretches the sheet 110 into a flat (i.e. planar) shape to cover the window aperture 104 while remaining spaced from the window pane 102 as shown in FIG. 3A. Once the sheet 110 is adhered to the window frame 106 the sheet 110 encloses the air pocket, which is shown at 230. The window pane 102 is thus insulated from the rest of the interior space of the building. As a result, the tendency for moisture to form on the window pane 102 due to temperature differences between the air on the interior side 109 and the window pane 102 itself, is reduced, or the amount of moisture that would form on the window pane 102 as a result of that temperature difference is reduced.

In a separate embodiment (not shown), the window pane 102 may be generally flush with respect to the peripheral surface 108 of the window frame 106. When hot air is applied to the sheet 110 mounted on the window frame, the sheet 110 will contract while maintaining an airtight seal across the window aperture 104 such that the sheet 10 may end up in contact with approximately the entire interior surface the window pane 102. However, this is less advantageous than the embodiment shown in FIGS. 3A and 3B wherein the air pocket 230 is enclosed, which inhibits heat transfer between the air inside the building and the window pane 102. Optionally the adhesive member 111 may be sufficiently thick that its own thickness is sufficient to the sheet 110 from the window pane 102 in embodiments in which the window pane 102 sits flush with the peripheral surface 108. A suitable thickness (shown at T in FIG. 3A) for the adhesive member 111 may be, for example, ⅛" or any other suitable thickness that is greater or less than ⅛".

The insulating, biodegradable sheet 110 presented herein may be a thermoplastic polyolefin. The thermoplastic can be any suitable thermoplastic, such as, but not limited to, polypropylene, block copolymer polypropylene, polymethylpentene, poly 1-butene, 4-methyl-pentene or ethylene-1-, propylene, 1-butene, 4-methyl pentene or a random or block copolymer of a polyolefin. In a preferred embodiment, due to its high relative strength, ability to stretch, heat resistance and transparency the polyolefin film is a biodegradable, polyethylene film. Additional films or layers may be applied to the sheet 110 to improve its functional characteristics. In an embodiment, the sheet of polyolefin film comprises at least two layers of polymeric material.

The sheet 110 is preferably at least partially transparent. In a preferred embodiment, the sheet 110 is transparent to such a degree that it does not reduce light transmission through the window pane 102 by more than 10% of the original light transmission through the window pane 102 when uncovered. Alternatively, the amount of reduction in light transmission may be any other suitable value that is greater than or less than 10%.

During application of heat to the sheet 110, the characteristic degree of the shrinking of the sheet 110 can be defined by defining a degree of linear contraction at a particular mean temperature of the stream of hot air that is supplied to the sheet 110. In a preferred embodiment, the sheet 110 will linearly contract by at least 65% when unrestrained and when the temperature of the heated air supplied to the sheet of polyolefin film is at or above 120 degrees Celsius.

In a further embodiment, the sheet 110 is fabricated so as to linearly contract by at least 50% when the temperature of the heated air supplied to the sheet of polyolefin film is above 110 degrees Celsius.

In an embodiment, the total thickness of the sheet 110 is in a range from 10 microns to 40 microns. The thickness of the sheet of polyolefin film is preferably in the range of from 15 microns to 25 microns.

In an embodiment, the sheet 110 has a tensile strength in a range from 95 to 110 N/mm$^2$, where the tensile strength is defined as the force per unit area required to break or yield a specimen of a section of material, as described in ASTM D882.

In a further embodiment, the sheet 110 has a breakdown elongation in a range from 105% to 130% where the breakdown elongation is defined as the extent to which a specimen of a section of material stretches or elongates until it reaches a point of breaking or yielding, as described in ASTM D882.

In an embodiment the adhesive member 111 is prebonded to at least the periphery of the sheet 110. In such an embodiment, the sheet 110 may have a 180-degree peel adhesion force per displacement on stainless steel of approximately 4.3 lbs/in. The 180-degree peel adhesion is a test to measure the adherence of a small of an adhesive material to a sheet of stainless steel under an increasing load, as described in ASTM D3330/PSTC-101.

The sheet 110 is preferably substantially impermeable to air and drafts of air or other gases. In an embodiment, the sheet 110*a* water absorbing characteristic for absorbing condensation that is deposited on the sheet. Specifically, the sheet 110 is capable of absorbing amounts of water in a range from 300 to 600 mg/cm$^3$, or more preferably, in a range from 400 to 500 mg/cm$^3$.

Figure 4:
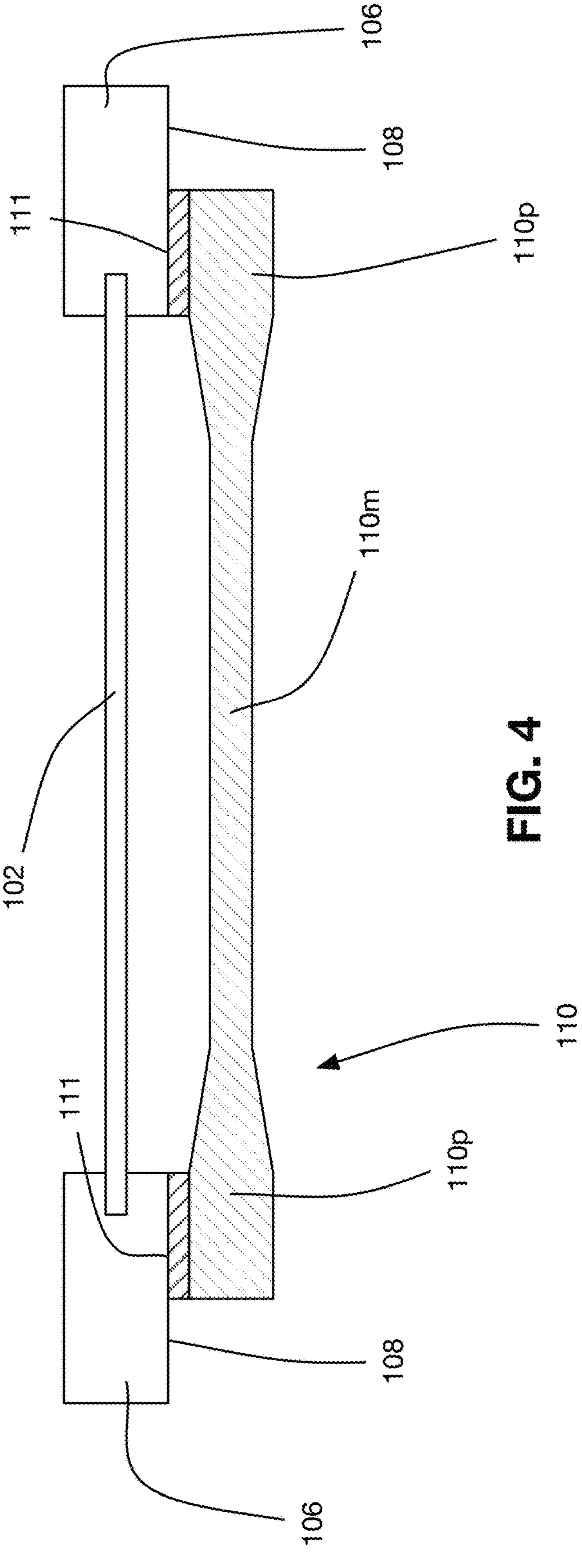
FIG. 4 is a sectional elevation view of the kit with another embodiment of the sheet.

In an embodiment, the sheet 110 may have a varying thickness across its surface area. In a non-limiting example, the sheet has a rectangular shape and the periphery (shown at 110*p*) of the sheet 110, which is adhered to the peripheral surface 108 of the window frame 106 may be thicker than the middle region (shown at 110*m*) of the sheet 110, as shown in FIG. 4 when heated to contract and to pull taut across the window aperture 104, will be more resistant to tearing at and around the region of adhesion between the sheet 110 and the peripheral surface 108 of the window frame 106.

The adhesive member 111 in the proposed kit serves to adhere the edges of the sheet 110 to the at least one surface of the window frame on which the sheet 110 is mounted. The adhesive member is able to provide an adhesive force between the window frame and the sheet 110 that is sufficiently strong so as to maintain an airtight seal between the sheet 110 and the frame for a predetermined service life during which the sheet 110 will be mounted on the frame. The adhesive member 111 provides a sufficiently strong adhesive force to maintain the airtight seal even when a large amount of condensate has formed onto the sheet 110 mounted on the window frame. Various embodiments of the adhesive member 111 may be employed, depending on which adhesive design is best suited to a particular window frame. Depending on the material characteristics and form of the window frame 106, a variety of configurations of adhesive members 111 may be employed.

In an embodiment shown in FIG. 1, the adhesive member 111 is a separate roll of a double-sided adhesive strip, however, it may be provided in the form of a double sided adhesive sheet that can be cut to any desired shape. The adhesive 310 can be applied as a plurality of pieces around all sides of the peripheral surface 108 of the window frame 106 surrounding the window aperture 104.

In an embodiment, the adhesive member 111 may be a liquid adhesive that is applied on the periphery of the sheet 110 prior to positioning of the sheet 110 on the peripheral surface 108. The liquid adhesive then cures or otherwise hardens sufficiently to form a substantially airtight seal.

In an embodiment, the adhesive member is integrated within the sheet itself. Exterior edges of sheet have an integrated adhesive layer which extends inwards from the outer edges of the sheet 110 to form a strip of adhesive about the periphery of the sheet 110. To prevent this strip of adhesive on the sheet 110 from prematurely curing or drying out, an adhesive laminate layer is applied on top of the strip of adhesive on the sheet 110. This adhesive, laminate layer is removed or peeled off prior to application of the sheet 110 to the window frame. The laminate layer may be applied to at least one side of the adhesive member 111 in other embodiments as well, such as when the adhesive member is in the form of a roll of a double sided strip.

The sheet 110 presented herein will automatically begin to break down after a pre-determined interval of time. If the sheet of biodegradable, polyolefin film remains adhered on the window frame after this pre-determined interval of time, it will begin a structural breakdown and decomposition and will no longer form an airtight seal insulating the window panel on the interior side of the window. In is understandably preferable that the sheet 110 is mounted onto the window frame for the duration of a service life of the sheet 110, where the service life of the sheet 110 is less than the predetermined interval of time to breakdown of the sheet 110.

In an embodiment, the pre-determined interval of time before breakdown of the sheet 110 is at least four months. The sheet of insulating biodegradable, polyolefin film is constructed to be mounted to the at least one surface of the window frame for a period of at less than four months before degradation of the biodegradable, polyolefin film occurs to an extent where the biodegradable, polyolefin film no longer forms an airtight seal, insulating the window pane on the interior side of the window.

At end of its service life, it is preferable that the sheet 110 be removed from the at least one surface of the window frame and placed in an environment more suitable for promoting biodegradation such as a compost bin. The sheet 110 will begin a process of self-breaking down and the long, entangled molecular structures of the film begin to form biodegradable intermediate structures. As the breakdown occurs, the molecular weight of the polyolefin polymer which makes up the sheet 110 is quickly reduced. In an embodiment, the reduction in molecular weight of the polyolefin polymer is from a molecular weight of approximately two-hundred thousand Daltons to a molecular weight of approximately one-hundred thousand Daltons. This rapid reduction in molecular weight of the polymer triggers a breakdown in the structural integrity of the polymer and will cause the sheet 110 to begin to fall apart and lose its original form and shape.

The time it takes for this reduction in molecular weight to occur so as to degrade the sheet 110 into an intermediate structure may vary due to varying environmental conditions. The environment in which the sheet 110 degrades generally requires a continuous presence of oxygen for continuous degradation of the sheet 110. The above-noted molecular-weight reduction is controlled within the particular film to control the rate and extent of the biodegradability. The rate of degradation of the film can be accelerated if the degradation environment exposes the film to ultraviolet light and heat. The rate of degradation can also be accelerated by the presence of microorganisms in the degradation environment or by increasing the rate oxygen exposure of the sheet 110.

Figure 5:
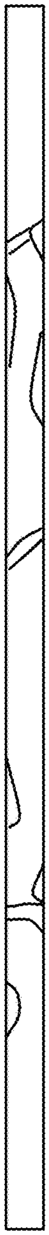
FIG. 5 is a sectional elevation view of a sheet shown in FIG. 2, in a partial state of breakdown.

The breakdown of the sheet 110 to the point where it is no longer air tight is represented in FIG. 5.

Once the initial breakdown is complete, the sheet 110 will continue to break down until it is no longer a polymer. As breakdown continues, microorganisms colonize the low molecular mass residues left by the film. As the microorganisms colonize the film, the sheet 110 transforms from a plastic to a material capable of bio-assimilation. In an embodiment, the transformation from a plastic to a bio-assimilating structure occurs when the film of the sheet 110 has a molecular weight of less that forty-thousand Daltons. As the breakdown continues, the bio-assimilating structure becomes water wettable and micro-organisms can attach to and begin to breakdown the carbon and hydrogen elements of the structure.

In an embodiment, the sheet 110 is oxo-biodegradable. The degradation occurs as a result of some form of oxidative and cell-mediated phenomena in the degradation environment of the film. The oxidative and cell-mediated phenomena which induce the degradation may occur either simultaneously or successively.

The sheet 110 need not be allowed to decompose prior to removal. In an embodiment, the sheet 110 is removed from the at least one surface of the window frame before the end of its service life and is recycled and processed prior to the end of the pre-determined interval of time and the breakdown of the molecular structures of the sheet 110.

Figure 6:
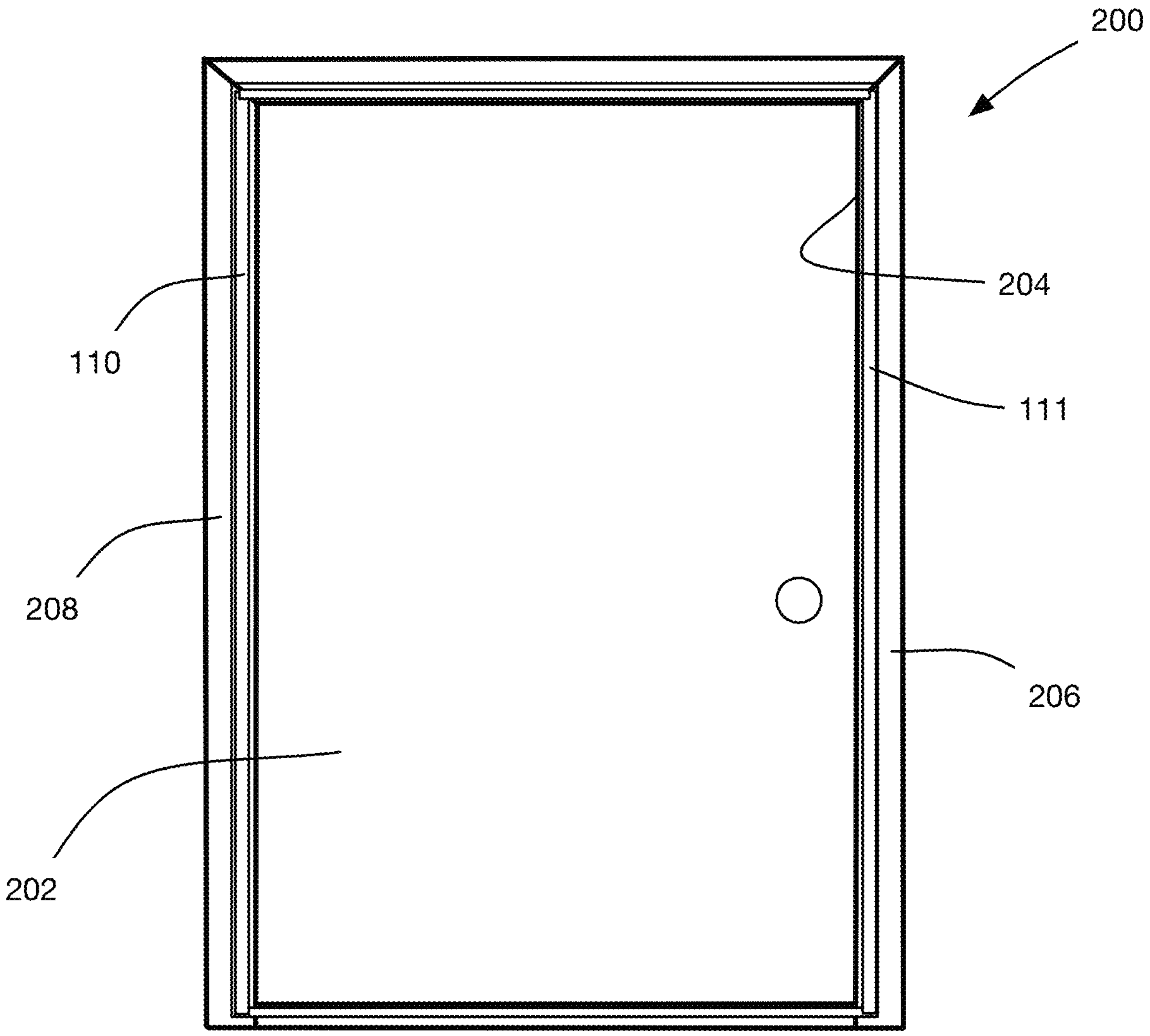
FIG. 6 is an elevation view of a doorway with the kit employed to insulate against heat transfer with the outside.

While the above-described embodiments have been described in relation to a window, it will be noted that the window is just an example of a building aperture that the sheet 110 described herein can be used with. For example, another building aperture that can be covered with the sheet 110, is a doorway 200, shown in FIG. 6. The doorway 200 has a doorway aperture 204 with a door 202 shown therein. The window pane 102 is an example of a 'first panel' in the building aperture that is the window aperture 104, whereas the door 202 is an example of a first panel in the building aperture that is the doorway aperture 204. In other words, the sheet 110 can be applied to a doorway in the same manner that it can be applied to the window, or to any other building aperture to reduce heat transfer with the air outside the building. The doorway 200 has a door frame shown at 206, which has a peripheral surface 208 on which the sheet 110 is applied, using the adhesive member Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The window frame 106 may also be a frame which supports a window panel of a sliding door, as is commonly used in glass sliding-door structures in residential units.

The invention claimed is:

1. An insulation kit for insulating an interior side of a window of a building, the window including a window pane and a window frame having a window aperture in which the window pane is mounted, and at least one peripheral surface on the interior side of the window which extends around an exterior edge of the window aperture, the insulation kit consisting essentially of:

an adhesive member; and a sheet of insulating, oxobiodegradable, transparent polyolefin film configured to be mounted to the at least one peripheral surface of the window frame by the adhesive member so as to cover the window aperture, and being heat shrinkable such that when a stream of heated air having a temperature is supplied to the sheet of polyolefin film by a heating device, the polyolefin film contracts to form an airtight seal, insulating the window pane on the interior side of the window;

wherein the polyolefin film is configured to linearly contract by about 50% when the temperature of the heated air supplied by the heating device is above 110 degrees Celsius (230 degrees Fahrenheit) and about 65% when unrestrained and when the temperature of the heated air supplied to the polyolefin film is at or above 120 degrees Celsius (248 degrees Fahrenheit);

wherein the polyolefin film has a thickness in a range from 10 microns to 40 microns ($3.9370\times10^{-4}$ inches to $1.5748\times10^{-3}$ inches);

wherein the sheet of polyolefin film has a water absorbing characteristic configured for absorbing condensation that is deposited on the sheet of polyolefin film such that the sheet absorbs amounts of water in a range from 300 to 600 mg/cm$^3$ (2.50362 to 5.007243 lb/gal); and wherein the sheet of polyolefin film is configured to be mounted to the at least one peripheral surface of the window frame for a period of about four months before degradation of the polyolefin film occurs to an extent where the polyolefin film no longer forms an airtight seal which insulates the window pane on the interior side of the window.

2. An insulation kit for insulating an interior side of a window of a building, the window including a window pane and a window frame having a window aperture in which the window pare is mounted and at least one surface on the interior side of the window which extends around an exterior edge of the window aperture, the insulation kit consisting of:

an adhesive member; and a sheet of insulating, oxobiodegradable, transparent polyolefin film configured to be mounted to the at least one surface of the window frame by the adhesive member so as to cover the window aperture, and being heal shrinkable such that when a stream of heated air having a temperature is supplied to the sheet of polyolefin film by a heating device, the polyolefin film contracts to form an airtight seal, insulating the window pane on the interior side of the window;

wherein the polyolefin film is configured to linearly contract by about 50% when the temperature of the heated air supplied by the heating device is above 110 degrees Celsius (230 degrees Fahrenheit) and about 65% when unrestrained and when the temperature of the heated air supplied to the polyolefin film is at or above 120 degrees Celsius (248 degrees Fahrenheit);

wherein the polyolefin film has a thickness in a range from 10 microns to 40 microns ($3.9370\times10^{-4}$ inches to $1.5748\times10^{-3}$ inches); and wherein the sheet of polyolefin film has a water absorbing characteristic configured for absorbing condensation that is deposited on the sheet of polyolefin film such that the sheet absorbs amounts of water in a range from 300 to 600 mg/cm$^3$ (2.50362 to 5.007243 lb/gal).

* * * * *